(12) United States Patent
Johnson

(10) Patent No.: US 10,341,432 B2
(45) Date of Patent: Jul. 2, 2019

(54) SYSTEM FOR OPTIMIZING WEB PAGE LOADING

(71) Applicant: Honeywell International Inc., Morristown, NJ (US)

(72) Inventor: Gareth Johnson, Billingshurst (GB)

(73) Assignee: Honeywell International Inc., Morris Plains, NJ (US)

( * ) Notice: Subject to any disclaimer, the term of this patent is extended or adjusted under 35 U.S.C. 154(b) by 276 days.

(21) Appl. No.: 14/697,594

(22) Filed: Apr. 27, 2015

(65) Prior Publication Data

US 2016/0315806 A1    Oct. 27, 2016

(51) Int. Cl.
*G06F 15/16*    (2006.01)
*H04L 29/08*    (2006.01)

(52) U.S. Cl.
CPC .......... *H04L 67/1095* (2013.01); *H04L 67/02* (2013.01)

(58) Field of Classification Search
CPC ............................. H04L 67/1095; H04L 67/02
USPC ........................................................ 709/203
See application file for complete search history.

(56) References Cited

U.S. PATENT DOCUMENTS

| | | | |
|---|---|---|---|
| 5,613,117 A | 3/1997 | Davidson et al. | |
| 5,864,852 A * | 1/1999 | Luotonen | H04L 61/301 726/14 |
| 7,664,813 B2 | 2/2010 | Petit et al. | |
| 7,707,182 B1 * | 4/2010 | Kee | G06F 16/182 707/638 |
| 7,886,284 B2 | 2/2011 | Haven et al. | |
| 8,108,773 B2 | 1/2012 | Fernstrom | |
| 8,335,838 B2 | 12/2012 | Zhang et al. | |
| 8,527,860 B1 * | 9/2013 | Colton | G06F 16/972 715/205 |
| 8,639,743 B1 * | 1/2014 | Colton | G06F 9/45525 709/203 |
| 8,688,829 B2 | 4/2014 | Lee et al. | |
| 8,713,049 B2 | 4/2014 | Jain et al. | |
| 8,775,626 B2 | 7/2014 | Teather et al. | |
| 8,817,757 B2 | 8/2014 | Luo | |
| 8,849,985 B1 * | 9/2014 | Colton | G06F 9/45529 709/203 |
| 9,055,124 B1 * | 6/2015 | Hill | H04L 65/403 |
| 9,110,945 B2 | 8/2015 | Jain et al. | |
| 9,141,596 B2 | 9/2015 | Meschkat et al. | |
| 2003/0014478 A1 * | 1/2003 | Noble | G06F 9/5083 709/203 |

(Continued)

*Primary Examiner* — Atta Khan
(74) *Attorney, Agent, or Firm* — Seager, Tufte & Wickhem LLP

(57) ABSTRACT

Optimizing web page loading by condensing web requests for files of a certain kind, format, or style. A system for web page loading may incorporate an embedded device having a processor, a web browser, and a web server for the embedded device connected to the web browser. One or more requests to the web server for files may be made by the web browser. Grouping a number of files of modules into one or a smaller number of files may speed up loading the files or requests for a web page. The one or more requests made by the web browser or the grouping the number of files into one or more files may be effected by a processor. The embedded device may combine resources on the fly, during runtime or dynamically into fewer resources when a request to do so is made.

15 Claims, 4 Drawing Sheets

(56) References Cited

U.S. PATENT DOCUMENTS

| | | | | |
|---|---|---|---|---|
| 2003/0061451 A1* | 3/2003 | Beyda | ............... | G06F 16/9574 |
| | | | | 711/137 |
| 2003/0115300 A1* | 6/2003 | Richard | ............. | H04L 67/2842 |
| | | | | 709/220 |
| 2007/0198634 A1* | 8/2007 | Knowles | ............ | H04L 67/2847 |
| | | | | 709/203 |
| 2010/0050089 A1* | 2/2010 | Kim | .................. | H04L 67/2828 |
| | | | | 715/749 |
| 2011/0191373 A1* | 8/2011 | Botros | .............. | G06F 16/9038 |
| | | | | 707/776 |
| 2013/0318208 A1* | 11/2013 | Seshadri | ............... | H04L 67/02 |
| | | | | 709/219 |
| 2017/0012988 A1* | 1/2017 | Turgeman | ............. | H04L 67/28 |

* cited by examiner

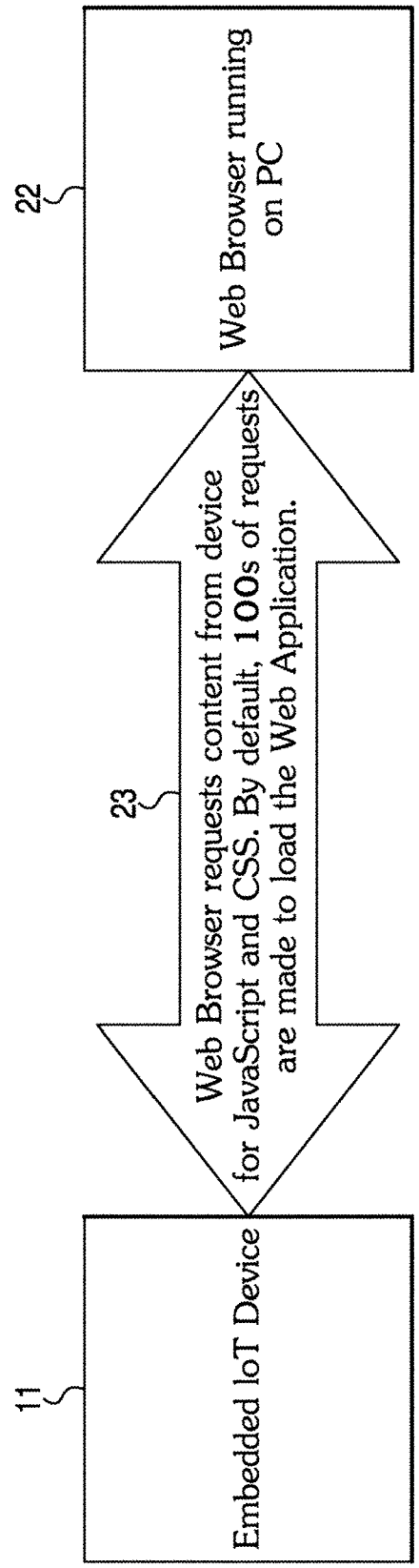

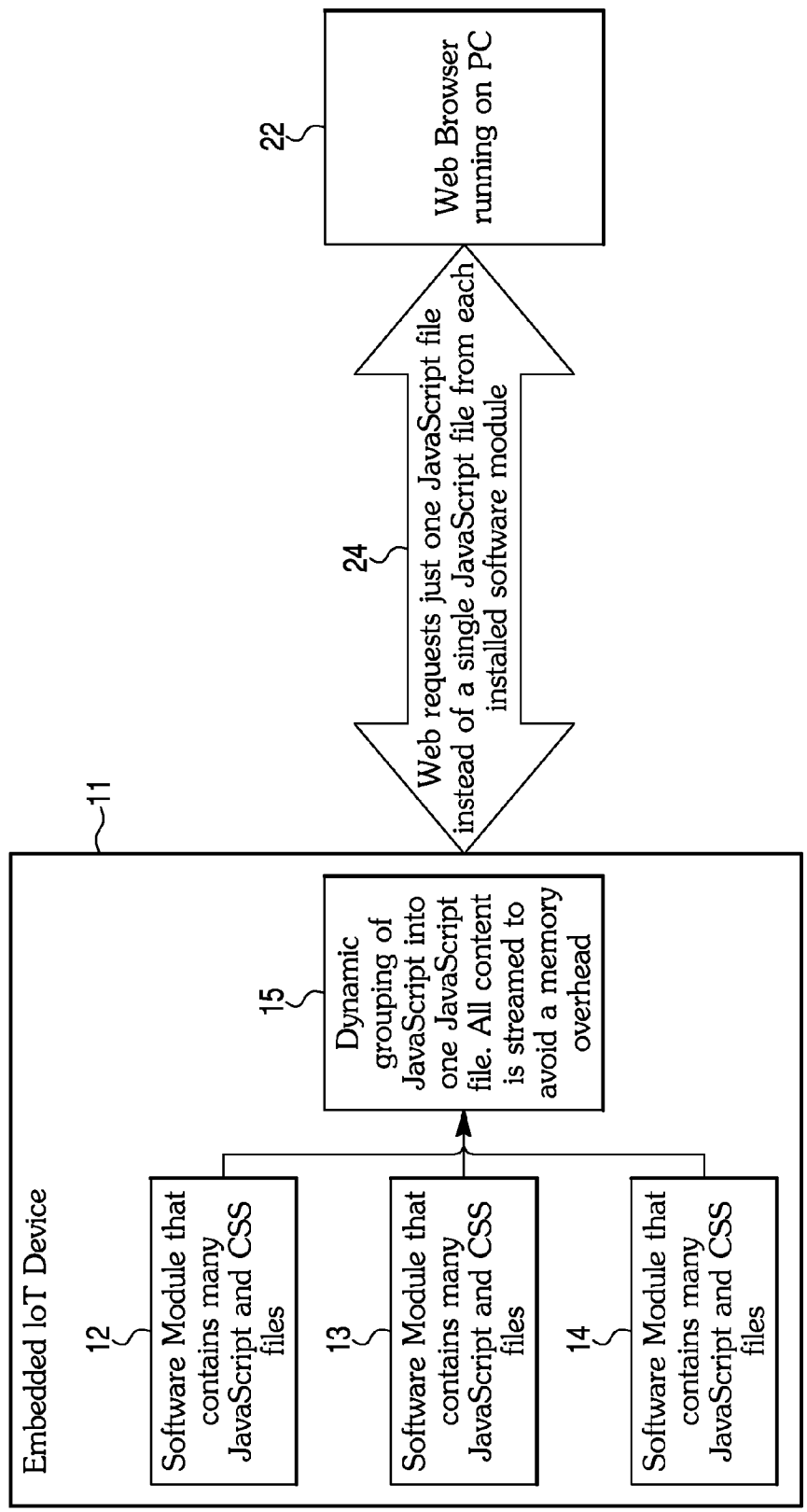

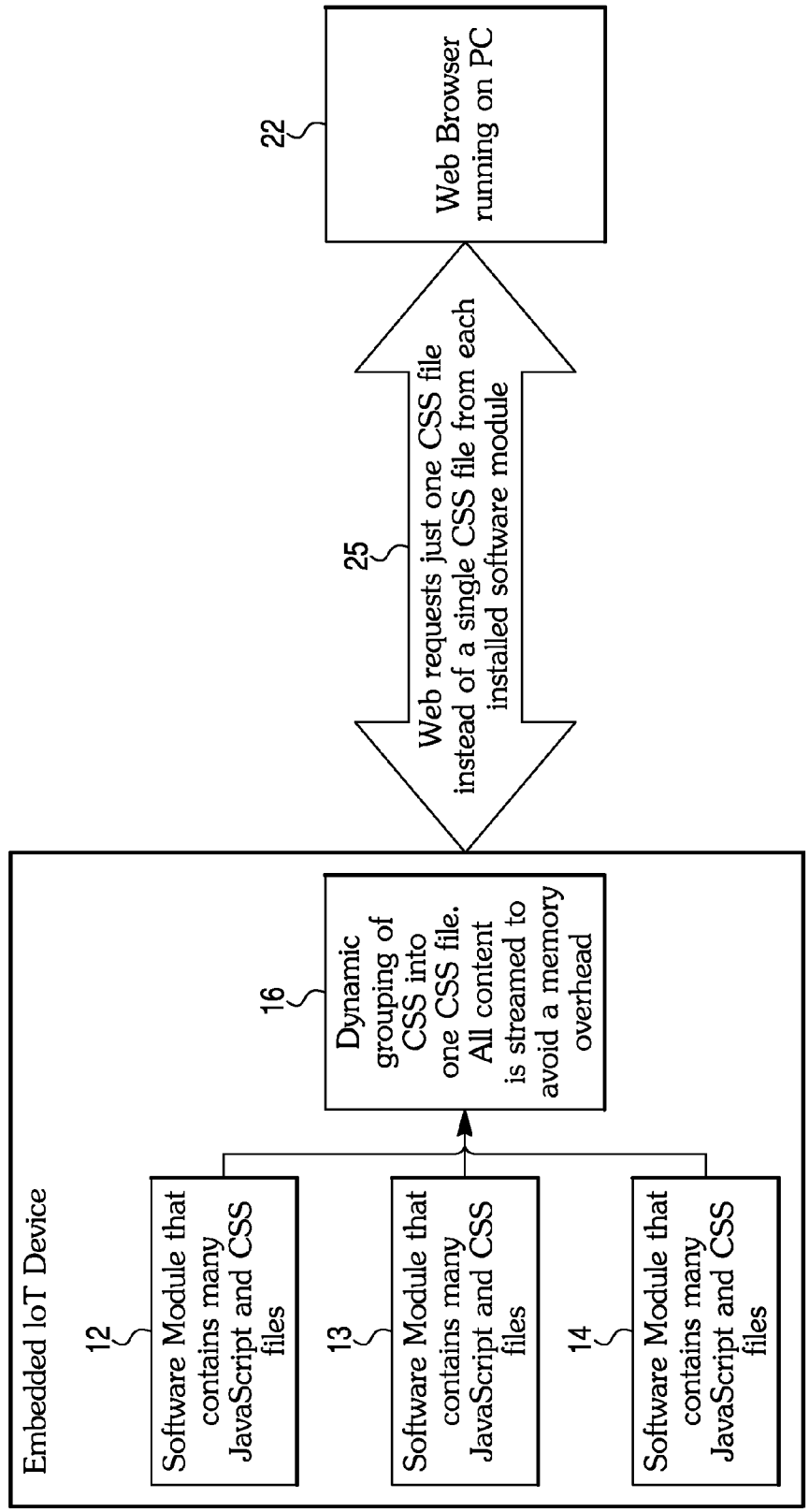

SYSTEM FOR OPTIMIZING WEB PAGE LOADING

BACKGROUND

The present disclosure pertains to loading of files or the like, and particularly to an optimized loading of a large number of files.

SUMMARY

The disclosure reveals optimizing web page loading by condensing web requests for files of a certain kind, format, or style. A system for web page loading may incorporate an embedded device having a processor, a web browser, and a web server for the embedded device connected to the web browser. One or more requests to the web server for files may be made by the web browser. Grouping a number of files of modules into one or a smaller number of files may speed up loading the files or requests for a web page. The one or more requests made by the web browser or the grouping the number of files into one or more files may be effected by a processor. The embedded device may combine resources on the fly, during runtime or dynamically into fewer resources when a request to do so is made.

BRIEF DESCRIPTION OF THE DRAWING

FIG. 2 is diagram of a web browser requesting the resources to start a web application;

FIG. 3 is diagram of the present system and approach in action for JavaScript files; and FIG. 4 is diagram of the present system and approach in action for CCS files.

DESCRIPTION

Figure 1:
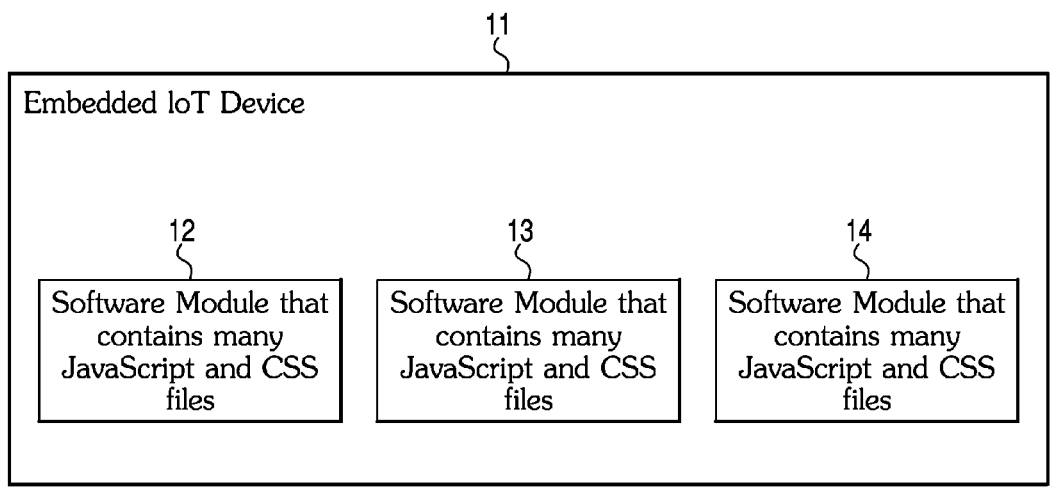
FIG. 1 is a diagram of an embedded device with installed software modules.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

An embedded IoT device may have limited resources to serve web content. Every request that a web browser makes to an embedded device's web server may use valuable resources. Therefore, to minimize the overhead, a minimum number of requests should be made.

"IoT" (internet of things) may be an umbrella term that refers to anything connected to the Internet. It may include traditional computing devices, such as laptops, tablets, and smartphones, but also may include a growing list of other devices that have recently become Internet enabled.

An embedded device is an object that may contain a special-purpose computing system. The system may be completely enclosed by the object. Generally, an embedded device's operating system may only run a single application which helps the device to do its job.

Optimizing web page loading may be achieved by condensing web requests for JavaScripts and CSS (cascading style sheets). Downloading larger chunks of resources may be far easier than many little requests to an embedded device.

CSS may be used for styling and/or formatting web applications, pages or sheets (colors, fonts, and so on). JavaScript may be a programming language that runs in a browser or the like.

The software running on an embedded IoT device may be modular. Therefore, it may be comprised of multiple software components working together that may be independently upgraded at any time.

The present system may solve this problem by grouping large chunks of resources together on the fly. In this case, the JavaScript and CSS used to create the web application may be grouped together into one large JavaScript file and one large CSS file, respectively.

The significant part of the present system is that this may be done dynamically at runtime. For instance, when the web browser requests the resources to start a web application, the embedded device may combine virtually all of the JavaScript together on the fly when the request is made. Therefore, one large virtual JavaScript file may be downloaded. This may enable a web application to start faster from an embedded device because fewer requests are being made.

This present approach may also enable the embedded IoT device to retain its modular system. One may assume that a module is upgraded on the embedded device. The next time that the web application is loaded, it may automatically receive an update because virtually all of the content is dynamically assembled on the fly.

The downloaded resources may be versioned against an embedded device's current configuration. Therefore, when a module is upgraded on the embedded device, the web application may know that it needs to re-download the web application.

The present system and approach may be coded and run on an embedded device. The code may know that a web application is being requested and know the resources that it needs to assemble together dynamically, during runtime or on the fly.

FIG. 1 is a diagram of an embedded device 11 with installed software modules. Each module may contain many CSS and JavaScript files. There may be a software module 12 that contains one or more JavaScript and CSS files, a software module 13 that contains one or more JavaScript and CSS files, and a software module 14 that contains one or more JavaScript and CSS files. There may be additional modules that contain one or more JavaScript and CSS files.

FIG. 2 is diagram of a web browser 22 requesting the resources to start a Web application. Many requests and responses are made to start the Web application. The large number of requests might cause problems for an embedded IoT device. There may be an embedded IoT device 11 and a web browser 22 running on a computer. Web browser 22 may request content from device 11 for JavaScript and CSS files via a connection 23. By default, hundreds of requests may be made to load a Web application.

FIG. 3 is diagram of the present system and approach in action for JavaScript files. One request for a JavaScript file may be made via connection 24. IoT device 11 may stream all content in one JavaScript file back to web browser 22. This may occur at runtime when the request is made. There may be a dynamic grouping at module 15, of JavaScript files of modules 12-14 into one JavaScript file. Virtually all content may be streamed to avoid a memory overhead. Web browser 22 may request just one JavaScript file instead of a single JavaScript file from each of the installed software modules, for instance, modules 12-14.

FIG. 4 is diagram of the present system and approach in action for CCS files. One request for a CCS file may be made via connection 25. IoT device 11 may stream all content in one JavaScript file back to web browser 22. This may occur at runtime when the request is made. There may be a dynamic grouping at module 16, of CSS files of modules 12-14 into one CSS file. Virtually all content may be streamed to avoid a memory overhead. Web browser 22 may request just one CSS file instead of a single CSS file from each of the installed software modules, for instance, modules 12-14.

The present system and approach may be implemented at least partially with products or resources of Niagara™, including Niagara 4, by Tridium™, Inc.

To recap, a system for optimizing web page loading, may incorporate a web browser, an embedded device having a processor, and a web server of the embedded device connected to the web browser. The web browser may make one or more requests to the web server of the embedded device. Loading a web page may be optimized by condensing the number of requests by the web browser. The embedded device may group resources together into a smaller number of resources or into one file when the request is made. Decreasing a number of files being downloaded may enable a web application from an embedded device to start faster than a web application not having a changed a number of files. An activity of the web browser, loading a web page or grouping resources may be effected by a processor.

The embedded device may incorporate one or more modules. The one or more modules may be upgraded.

When the web application is loaded, the system may automatically receive an update and because all content of the resources may be assembled dynamically, during runtime or on the fly.

Resources that are downloaded may be versioned against a current configuration of the embedded device.

When the resources are upgraded, the web application may know that it needs to be reloaded.

An approach of the system may have a code and may be run on the embedded device. The code may know that resources are being requested and may know what resources need to be assembled together. The resources may assembled together dynamically, during runtime, or on the fly.

An approach for optimizing web page loading may incorporate connecting a web server of an embedded device having a processor to a web browser, having the web browser make requests to the web server of the embedded device, optimizing a loading of a web page by condensing the requests by the web browser, and grouping resources together dynamically. Web developer language files or style sheet files being downloaded as a decreased number of web developer language files or style sheet files may enable a web application to be faster than when the files are respectively being downloaded as a larger number. Activity of the web browser, condensing requests or grouping resources may be effected by the processor.

The embedded device may incorporate one or more modules.

The approach may further incorporate upgrading the one or more modules of the embedded device.

When the one or more modules of the embedded device are upgraded, the web page may know that it needs to be reloaded.

Loaded resources may be versioned against a current configuration of the embedded device. When the web page is loaded, it may automatically receive an update when virtually all content is assembled dynamically, on the fly or during runtime.

A code may be run on the embedded device. The code may contain information that a web page is being requested and that resources need to be assembled together.

The web developer language files may be JavaScript files. The style sheet files may be cascade style sheet files.

A mechanism for web page loading may incorporate an embedded device having a processor, a web browser, and a web server for the embedded device connected to the web browser. One or more requests to the web server for files may be made by the web browser. Grouping a number of files of modules into one or a smaller number of files may speed up loading the requests or files for a web page. The one or more requests made by the web browser or the grouping the number of files into one or more files may be effected by a processor.

The embedded device may combine resources on the fly, during runtime or dynamically into fewer resources when a request to do so is made. The resources may incorporate JavaScript files and cascade style sheet files.

The embedded device may incorporate one or more modules. The one or more modules may be upgraded. Resources that are downloaded may be versioned against a current configuration of the embedded device.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for optimizing web application loading, comprising:
   a web browser stored on a computing device configured to make a request to a web server for resources to create a web application; and
   an embedded device communicatively coupled to the web server, the embedded device including:
   a special-purpose computing system having a processor and a plurality of modules, wherein each of the plurality of modules comprises one or more software components having a plurality of resources and instructions and the processor is configured to:
   receive a request from the web server for a first resource from a first module of the plurality of modules;
   obtain the instructions from the first module in response to receiving the request for the first resource
   identify a second resource from a second module of the plurality of modules that is needed by the web browser to create the web application, wherein the instructions disclose to the processor that the second module has the second resource that is needed based on the first resource that is requested by the web server;
obtain the first resource from the first module and the second resource from the second module;
group the first resource and the second resource into a smaller single resource or into one file;
send a response that includes the smaller resource or the one file to the web server to be forwarded to the computing device; and
automatically send an updated smaller single resource or an updated one file to the web server to be forwarded to the computing device when the first resource or the second resource is upgraded; and wherein:
the embedded device is configured to receive an upgrade for the first resource or the second resource from the web server and in response, the processor is further configured to:
identify the upgrade for the first resource or the second resource;
group the first resource or the second resource-into the updated smaller single resource or into the updated one file; and
the updated smaller single resource or the updated one file is forwarded to the computing device without receiving another request for the first resource or the second resource from the computing device.

2. The system of claim 1, wherein the upgrade is identified by versioning resources that are downloaded against a current configuration of the first resource or the second resource.

3. The system of claim 1, wherein when the first resource or the second resource-are upgraded, the web application knows that it needs to be reloaded.

4. The system of claim 1, wherein:
the instructions know that the first resource or the second resource-are being requested and know the first resource or the second resource-need to be assembled together.

5. The system of claim 4, wherein the first resource or the second resource-are assembled together dynamically, during runtime, or on the fly.

6. A method for optimizing a web application loading using an embedded device configured to perform the steps of:
receiving a request from a web browser for a first resource from a first module of a plurality of modules-to generate the web application;
obtaining instructions from the first module in response to receiving the request for the first resource;
identifying a second resource from a second module of the plurality of modules that is needed by the web browser to generate the web application, wherein the instructions disclose to the embedded device that the second module has the second resource that is needed based on the first resource that is requested by the web server;
obtaining the first resource from the first module and the second resource from the second module;
grouping the first resource and the second resource-into a smaller single resource or into one file;
sending a response that includes the smaller single resource or the one file to a web server to be forwarded to a computing device generating the web application; and automatically sending an updated smaller single resource or an updated one file to the web server to be forwarded to the computing device when the first resource or the second resource is upgraded; and wherein:
the embedded device is configured to receive an upgrade for the first resource or the second resource from the web server and in response, the processor is further configured to:
identify the upgrade for the first resource or the second resource;
group the first resource or the second resource-into the updated smaller single resource or into the updated one file; and
the updated smaller single resource or the updated one file is forwarded to the computing device without receiving another request for the first resource or the second resource from the computing device.

7. The method of claim 6, wherein the embedded device comprises the plurality of modules.

8. The method of claim 6, wherein when the first resource or the second resource-are upgraded, the web application knows that it needs to be reloaded.

9. The method of claim 6, wherein the upgrade for the first resource or the second resource-is versioned against a current configuration of the first resource and the second resource.

10. The method of claim 8, wherein when the web application is loaded, it automatically receives an update when virtually all content is assembled dynamically, on the fly or during runtime.

11. The method of claim 6, wherein:
the instructions contain information that the web application is being requested and that the first resource or the second resource-needs to be assembled together.

12. The method of claim 6, wherein the web application is loaded using web developer language files comprised of JavaScript files and style sheet files comprised of cascade style sheet files.

13. An embedded device for web application loading, comprising:
a special-purpose computing system having a processor and a plurality of modules, wherein each of the plurality of modules comprises one or more software components having a plurality of resources and instructions and a processor configured to:
receive a request from a web browser for a first resource from a first module of the plurality of modules;
obtain the instructions from the first module in response to receiving the request for the first resource;
identify a second resource from a second module of the plurality of modules that is needed by the web browser to create the web application, wherein the instructions disclose to the processor that the second module has the second resource that is needed based on the first resource that is requested by the web server;
obtain the first resource from the first module and the second resource from the second module;
group the first resource and the second resource-into a smaller single resource or into one file;
send a response that includes the smaller single resource or the one file to the web server to be forwarded to a computing device loading the web application; and automatically send an updated smaller single resource or an updated one file to the web server to be forwarded to the computing device when the-first resource or the second resource is upgraded; and wherein the embedded device is configured to receive an upgrade for the first resource or the second resource-from the web server and in response, the processor is further configured to:

identify the upgrade for the first resource or the second resource; and group the first resource or the second resource-into the updated smaller single resource or into the updated one file; and wherein the updated smaller single resource or the updated one file is forwarded to the computing device without receiving another request for the first resource or the second resource-from the computing device.

14. The embedded device of claim 13, wherein the processor combines resources on the fly, during runtime or dynamically into fewer resources when a request to do so is made.

15. The embedded device of claim 14, wherein the upgrade is identified by versioning resources that are downloaded against a current configuration of the first resource and the second resource.

* * * * *